United States Patent [19]

Koide et al.

[11] Patent Number: 5,069,479
[45] Date of Patent: Dec. 3, 1991

[54] AIR BAG DEVICE

[75] Inventors: Teruhiko Koide; Kozi Buma; Takashi Ogasawara; Hiroaki Shinto, all of Aichi, Japan

[73] Assignee: Kabushiki Kaisha Tokai-Rika-Denki-Seisakusho, Aichi, Japan

[21] Appl. No.: 562,261

[22] Filed: Aug. 3, 1990

[30] Foreign Application Priority Data

Aug. 9, 1989 [JP] Japan .................................. 1-93523[U]

[51] Int. Cl.$^5$ ............................................... B60R 21/32
[52] U.S. Cl. ..................................... 280/734; 280/731; 280/737; 280/741
[58] Field of Search ............... 280/728, 731, 737, 741, 280/734

[56] References Cited

FOREIGN PATENT DOCUMENTS

60-248257 12/1985 Japan .
60-248454 12/1985 Japan .
60-248455 12/1985 Japan .
60-248456 12/1985 Japan .

Primary Examiner—Kenneth R. Rice
Attorney, Agent, or Firm—Sixbey, Friedman, Leedom & Ferguson

[57] ABSTRACT

An air bag device is equipped with a restricting member for preventing an air bag accommodated in an air bag main body from being inflated erroneously upon impact before the air bag main body is attached to a body of a vehicle inclusive of a steering wheel. This restricting member, only when a deactivating member for deactivating the operation of an acceleration sensor is in operation, allows the air bag main body to approach a designated attaching area of the body of a vehicle. After the air bag main body is secured, the operation of the deactivating member is released to the put the acceleration sensor in an operation activating condition.

20 Claims, 8 Drawing Sheets

AIR BAG DEVICE

BACKGROUND OF THE INVENTION

1. Field of the Invention

The present invention relates to an air bag device in which an air bag inflates in front of a passenger or driver upon sudden acceleration in order to protect the passenger or driver.

2. Background Information

Recently, various air bag devices have been proposed in which an air bag inflates when a vehicle abruptly decelerates in order to protect a passenger or driver (see Japanese Patent Application Laid-Open Nos. 60-248454, 60-248455, 60-248456, 60-248457, etc.).

With this type of air bag device, before the air bag main body is attached to a steering wheel, the movement of balls are prevented by means of a lock bar so that the air bag does not inflate even if the air bag main body is subjected to an image.

After the air bag main body is secured to the steering wheel by fixing bolts, a slide member is inserted into the air bag main body to move a release pin upward which shifts the lock bar. The balls are thus allowed to move.

In the prior art, however, the air bag main body and the release pin are formed independent from each other so that they can be separately attached to and detached from the steering wheel. In other words, the air bag main body can be attached to and detached from the steering wheel even when the release pin has moved the lock bar.

Therefore, if an impact is accidently applied to the air bag main body during its attachment to and detachment from the steering wheel, the air bag will probably inflate.

SUMMARY OF THE INVENTION

It is an object of the present invention to provide an air bag device whose air bag is prevented from inflating during the attaching and detaching of an air bag main body.

In an air bag device according to the present invention, an air bag main body is inserted up to a designated attaching area of a body of a vehicle and secured to the body of the vehicle by an attaching means such as attaching screws. A restricting means, only when an acceleration-sensor-operation deactivating means is in operation, allows the air bag main body to approach the designated attaching area. After the air bag main body is secured to the body of the vehicle, the deactivating means is released to allow acceleration measurement. Therefore, the air bag is never inflated even if an impact is applied to the air bag main body not yet secured to the body of the vehicle.

BRIEF DESCRIPTION OF THE DRAWINGS

FIGS. 1 through FIG. 8 show a first embodiment of an air bag device according to the present invention in which:

FIGS. 9 and 10 show a second embodiment of the air bag device according to the present invention in which:

DESCRIPTION OF THE PREFERRED EMBODIMENTS

FIGS. 1 through 8 show a first embodiment of an air bag device according to the present invention.

Figure 7:
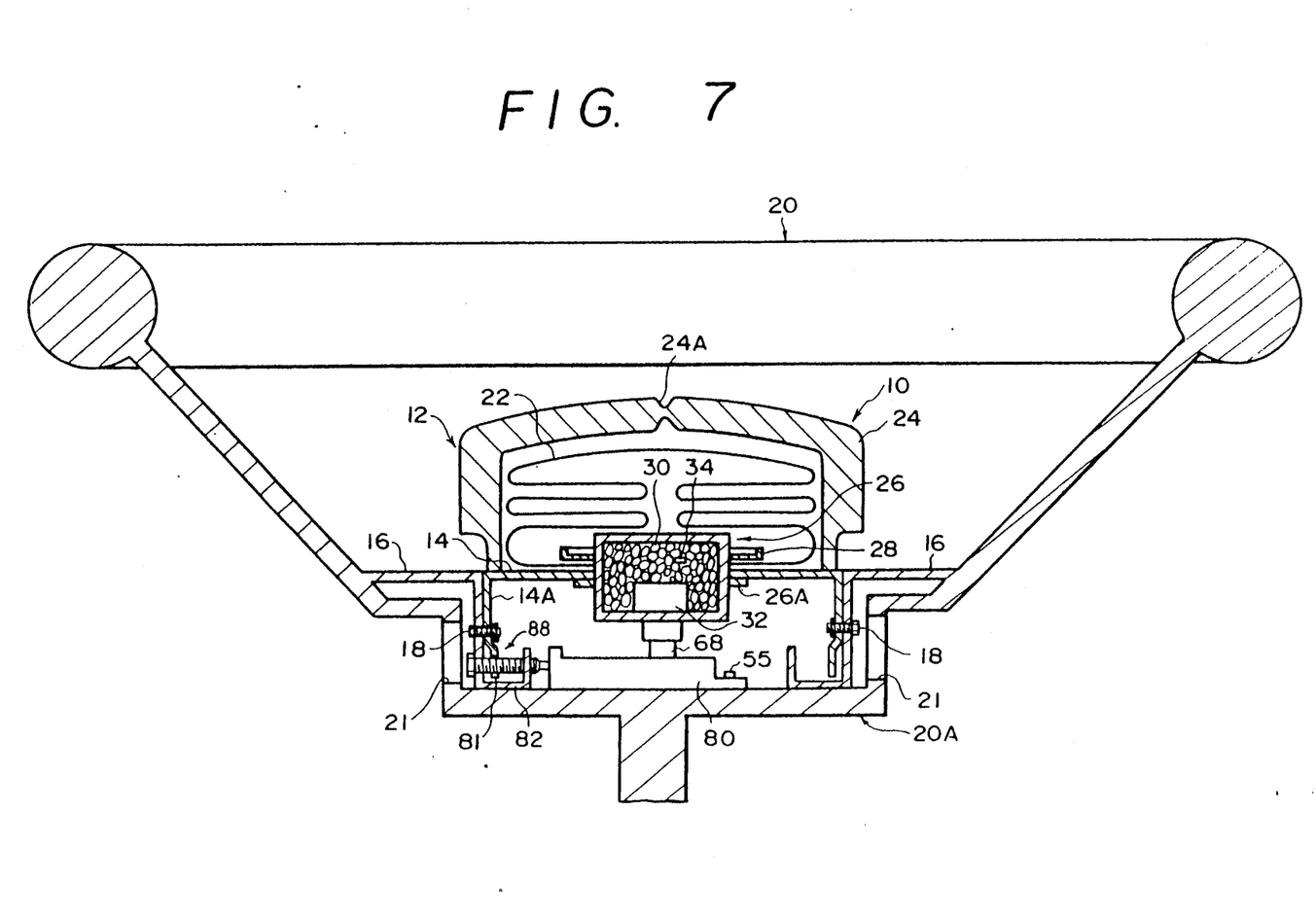
FIG. 7 is a schematic sectional view showing the air bag device attached to a steering wheel.

As shown in FIG. 7, an air bag main body 12 of an air bag device 10 is mounted to a steering wheel 20 by abutting a downward portion 14A of a base plate 14 in correspondence with a bracket portion 16 of the steering wheel 20 and then fixing them together with fixing bolts 18.

A hub portion 20A of the steering wheel 20 has cut-out window portions 21 formed in a lateral portion thereof, in which covers (not shown) are fitted. The bracket portion 16 and the downward portion 14A have bolt holes 18A and 18B (see FIGS. 5 and 6) formed in portions thereof corresponding to the windows 21, into which fixing bolts 18 are threadedly inserted. Nuts 18C are fixed to the inner surface of the downward portion 14A concentrically with the bolt holes 18B.

Figure 1:
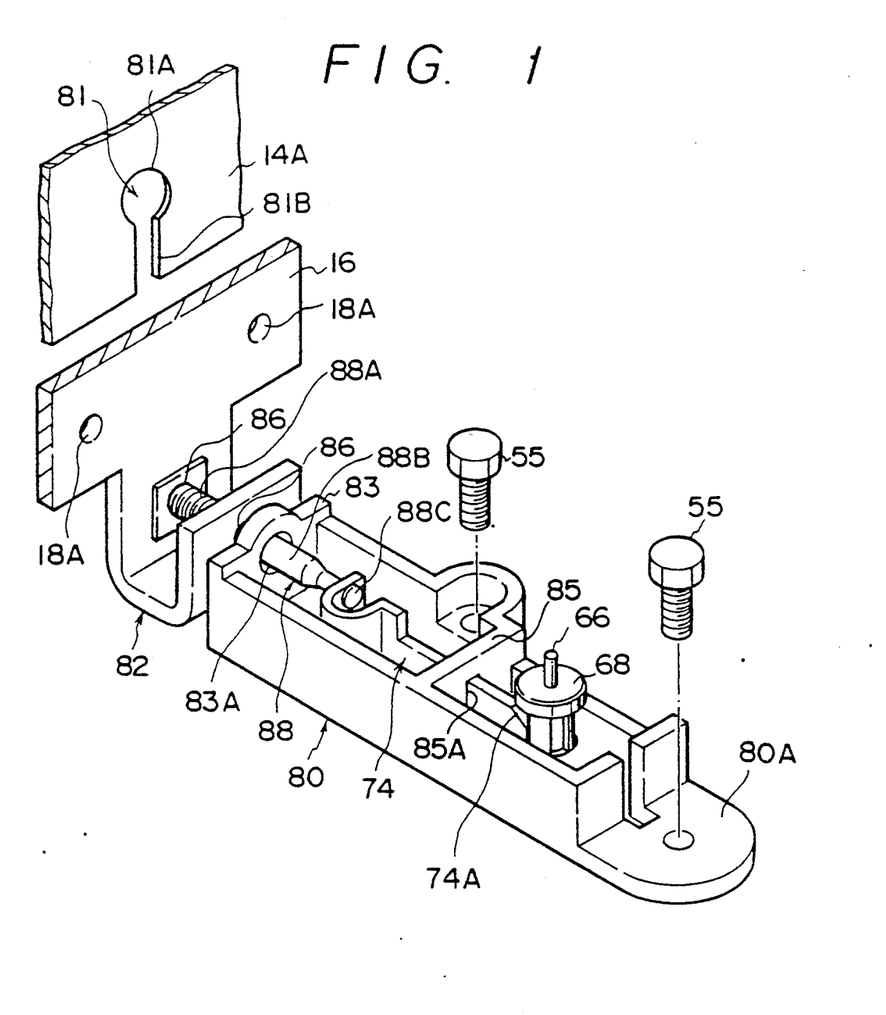
FIG. 1 is a perspective view showing a base plate downward portion, a base, a slide member, etc.

As shown in FIG. 1, the downward portion 14A of the base plate 14 has a bolt accommodating hole 81 formed with a notch. A bottom portion 81A (an upper portion in FIG. 1) of the bolt accommodating hole 81 is circular. Its inlet portion 81B (a lower portion in FIG. 1) defines a uniform notch. The inner diameter of the bottom portion 81A is larger than the width of the gap or inlet portion 81B.

A bolt hole 86 is formed through a substantially U-shaped tongue portion 82 that extends downward from an intermediate portion of the bracket portion 16. Inserted through this bolt hole 86 is a long bolt 88 acting as means for deactivating the movement of an inertial mass.

A distal end portion 88C of the long bolt 88 is coupled with a slide member 74. When the long bolt 88 is inserted through (in the direction of the arrow A in FIG. 4) a slanted portion 74A of the slide member 74 abuts against a slanted portion of a release pin 66 in such a manner as to push the release pin 66 upward.

At a base end portion of the long bolt 88 a male screw portion 88A is formed. The diameter of the male screw portion 88A is slightly smaller than the diameter of the bottom portion 81A of the bolt accommodating hole 81, but larger than the notch width of the inlet portion 81B so that it cannot pass through the inlet portion 81B. The diameter of an intermediate portion 88B of the long bolt 88 is smaller than the notch width of the inlet portion 81B.

As shown in FIG. 7, an air bag 22, an air bag cover 24, and an inflator 26 are mounted on the base plate 14.

The air bag 22 is disposed in folded form on the upper side (in FIG. 7) of the base plate 14 corresponding to the side of the passenger. The edge of the opening side of the air bag 22 is mounted via a ring plate 28 to a substantially central portion of the base plate 14. The ring plate 28 is secured to the base plate 14 by bolts not shown in such a manner that the edge of the opening side of the air bag 22 is pressed against the base plate 14.

The air bag cover 24 is disposed on the upper side (in FIG. 7) of the base plate 14 corresponding to the side of the passenger and accommodate the air bag 22 between them. The air bag cover 24 has a frame-shaped core not shown embedded in the peripheral edge thereof, and is attached to the base plate 14 by securing the cored thereto by rivets or the like. A portion 24A of the air bag cover 24 located opposite from the base plate 14 is made thin, so that the air bag cover 24 is easy to break at this thin portion.

The column-shaped inflator 26 passes through a substantially central portion of the base plate 14 and projects into the air bag 22. The inflator 26 has a flange 26A formed on its outer periphery, and is secured to the surface (in FIG. 7) of the base plate 14 that is opposite to the surface of the side of the passenger by bolts not shown.

As shown in FIG. 7, the inflator 26 is charged with a gas producing material 30 and equipped therein is a starting unit 32 for burning the gas producing material 30.

Upon burning, the gas producing material 30 decomposes to discharge a large quantity of gas into the air bag 22 thus inflating it. A detonator 34 is disposed in the gas producing material 30 which is around the starting unit 32. When the detonator 34 explodes, an ignition agent catches fire to burn the gas producing material 30.

Figure 2:
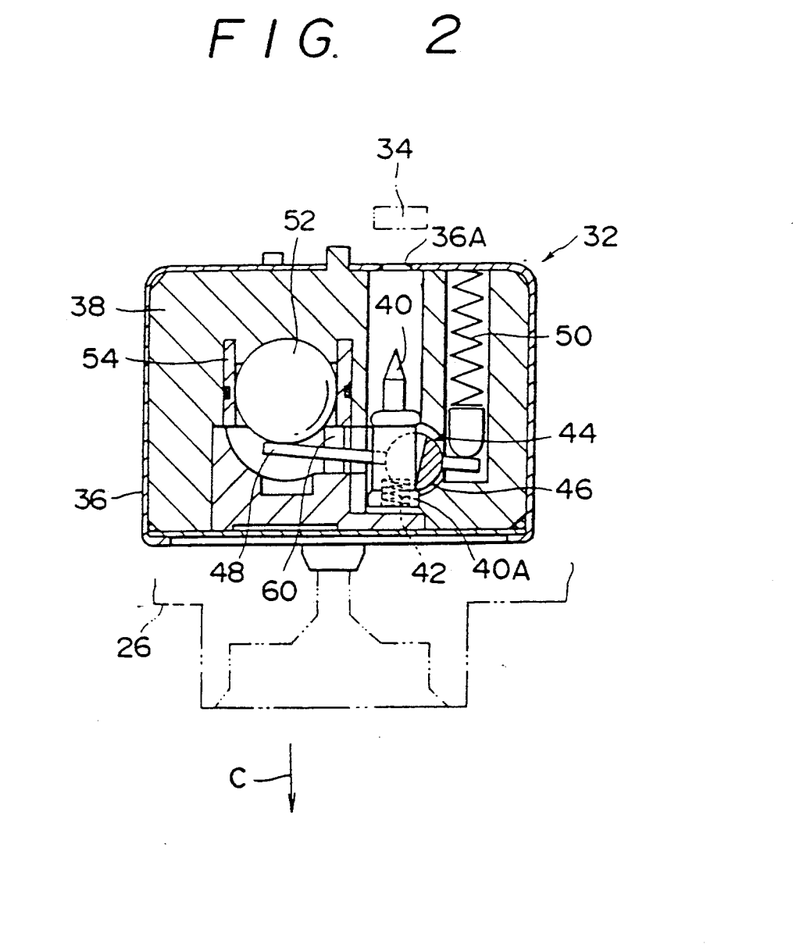
FIG. 2 is a sectional view taken along line II—II in FIG. 3.

In the starting unit 32 shown in FIG. 2, a block 38 is secured in a housing 36, and a firing pin 40 is supported by the block 38.

The firing pin 40 is movably supported in the axial direction thereof (in the vertical direction in FIG. 2). Upon axial movement, the point of the firing pin passes through a hole 36A formed in the housing 36 and collides with the detonator 34, so that the detonator 34 explodes.

The firing pin 40 has a collar portion 40A engaged with a drive shaft 44; thus, the firing pin 40 is kept in a non-contacting state with the detonator 34 by the urging force of a compression coil spring 42.

Figure 8:
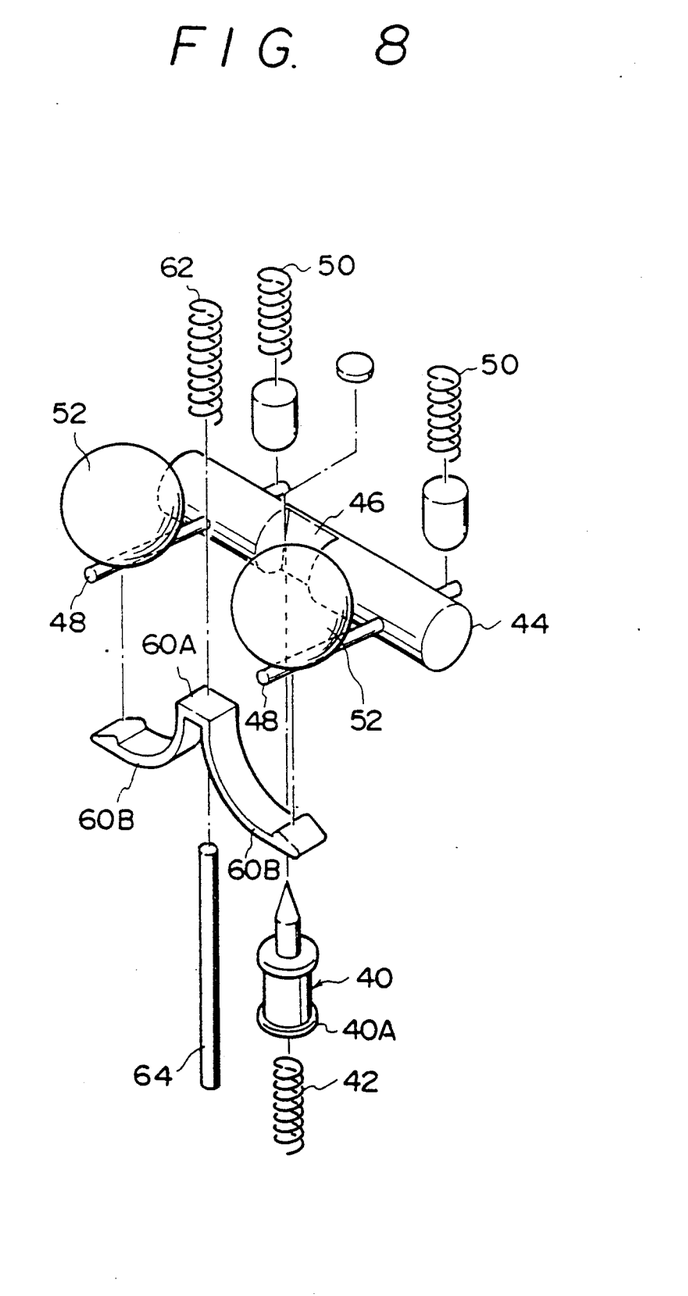
FIG. 8 is an exploded perspective view showing a portion of the starting unit.

As shown in FIG. 8, the drive shaft 44 is disposed in an orthogonally crossing relation with the firing pin 40, whose central portion is cut out in a substantially semi-circle form. The thus formed arcuate portion 46 engages with the collar portion 40A of the firing pin 40. The drive shaft 44 is rotatably supported by the block 38. Upon rotation, the arcuate portion 46 disengages from the collar portion 40A of the firing pin 40, so that the firing pin 40 collides with the detonator 34 by virtue of the urging force of the compression coil spring 42.

Figure 3:
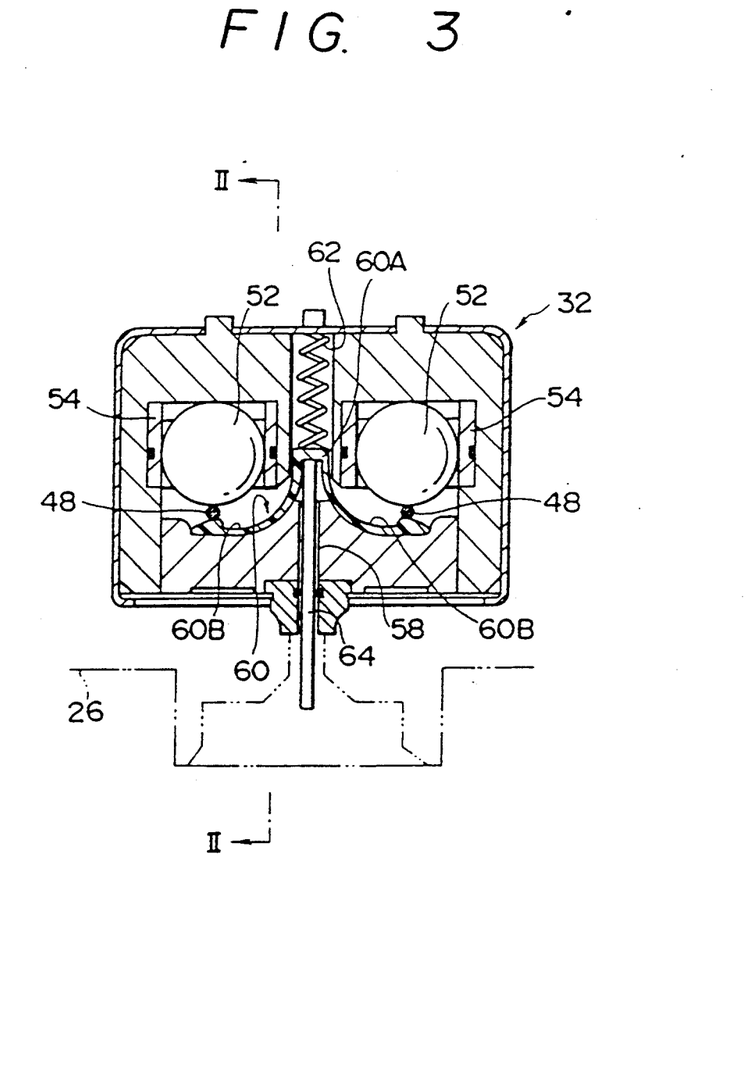
FIG. 3 is a sectional view of a starting unit.

The levers 48 are secured to the drive shaft 44 (see FIGS. 3 and 8). On one end of each lever 48 is a compression coil spring 50. The other end of each lever 48 is held in contact with a ball 52 acting as inertial mass.

The ball 52 is accommodated in a cylinder 54 and is supported by the block 38. When a car abruptly decelerates, the levers 48 move by virtue of the force of inertia in opposition to the urging force of the compression coil spring 50.

As shown in FIG. 3, a lock bar 60, acting as inertial-mass-movement disabling means, is supported around the levers 48 by the block 38 and movable in the axial direction (in the vertical direction in FIG. 3). The lock bar 60 has a pair of flexible portions 60B which bifurcate at a base portion 60A thereof. Each flexible portion 60B is disposed retractably in relation to the swing path of the corresponding levers 48 upon axial movement. Accordingly, when the flexible portions 60B advance into the swing paths of the levers 48, they disable the swinging of the levers 48.

The lock bar 60 is urged by a compression coil spring 62 so that the flexible portions 60B advance into the swing paths of the levers 48 (in the downward direction in FIG. 3). The lock bar 60 contacts a lock shaft 64 so that by means of the lock shaft 64, the flexible portions 60B retract from the swing paths of the levers 48 in opposition to the urging force of the compression coil spring 62.

The lock shaft 64 is supported by a pin insertion hole 58 formed in the block 38 and inflator 26, and upon axial movement, pushes the lock bar 60 so that the flexible portions 60B of the lock bar 60 retract from the swing paths of the levers 48.

Figure 4:
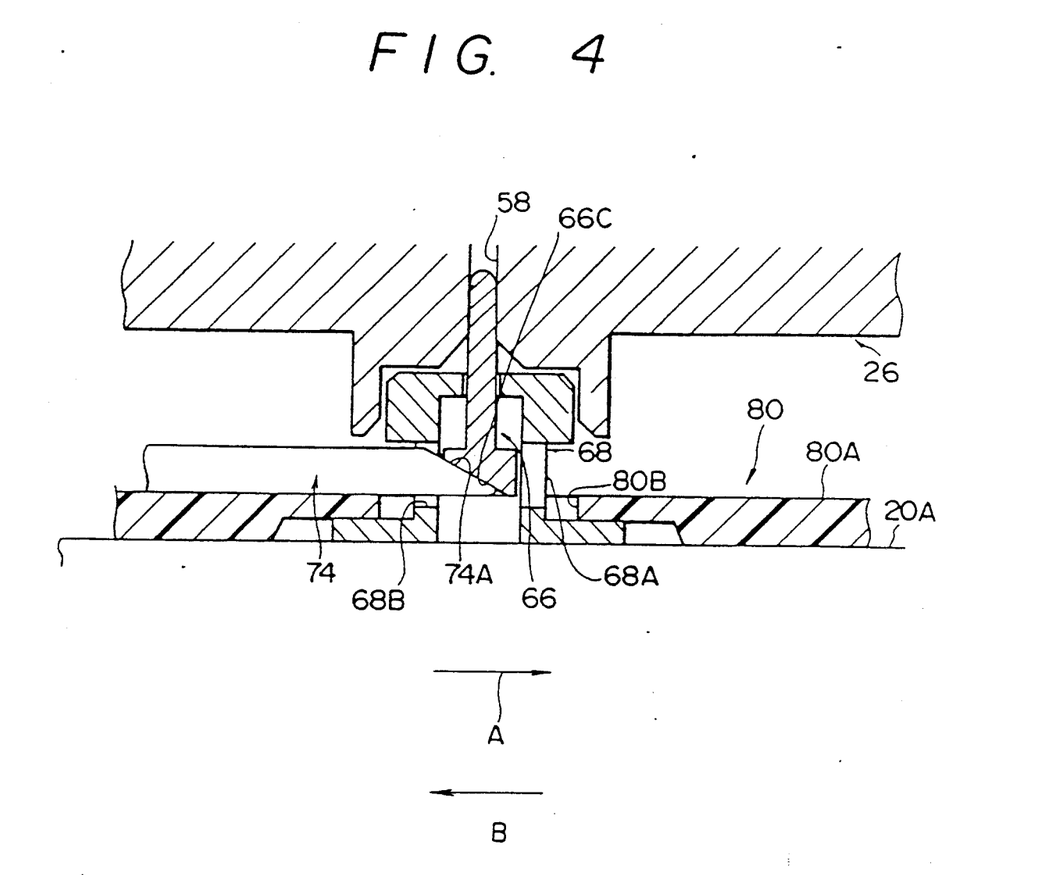
FIG. 4 is a fragmentary sectional view showing the base and a holder.

As shown in FIG. 4, the release pin 66 acting as releasing member is supported in a holder 68 movably in the axial direction (in the vertical direction in FIG. 4).

The holder 68 is supported by a base 80 which in turn is secured to the hub portion 20A of the steering wheel 20 for the air bag device 10 by bolts 55 (shown in FIG. 1). The holder 68 has an opening 68B, extending orthogonally in the axial direction and formed in an intermediate portion thereof, into which the slide member 74 is inserted.

Figure 5:
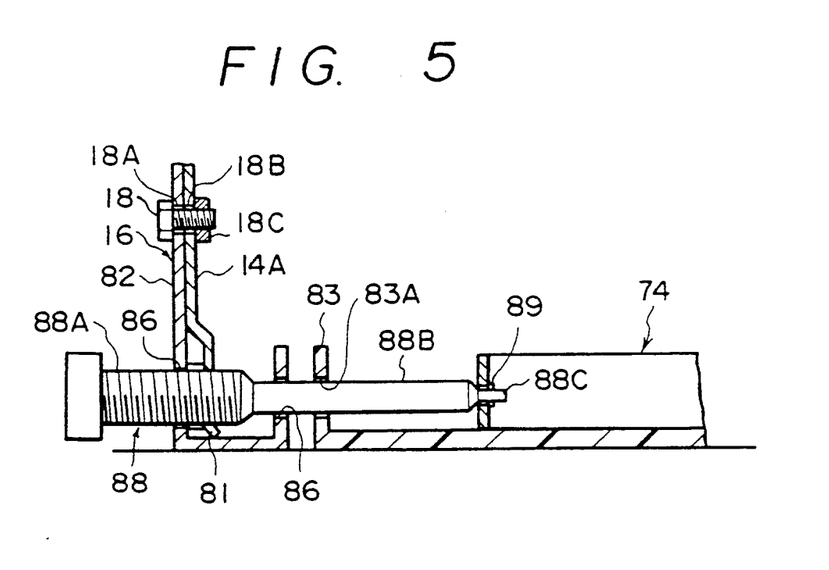
FIG. 5 is a schematic sectional view showing a long bolt in a threaded-in state.
Figure 6:
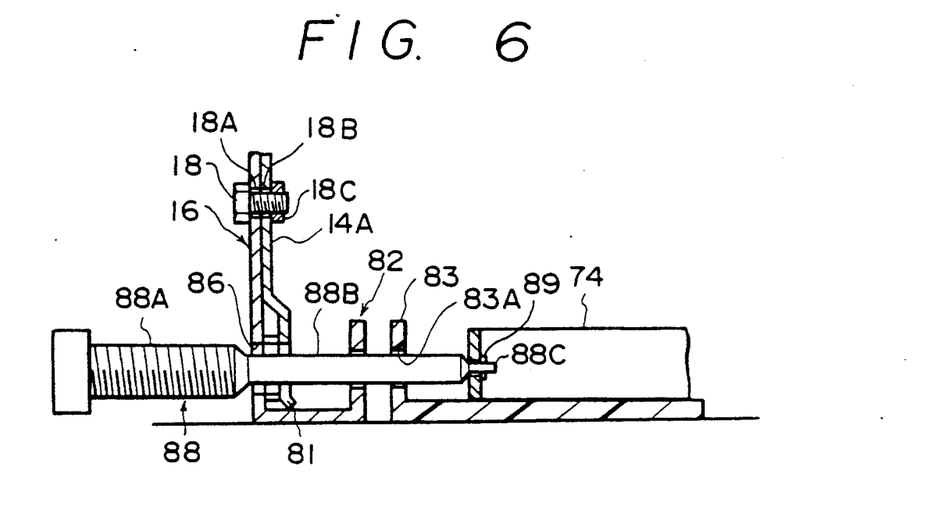
FIG. 6 is a schematic sectional view showing the long bolt in a loosened state.

As shown in FIGS. 5 and 6, the small-diameter end portion 88C of the long bolt 88 passes through the slide member 74 and is secured by a snap ring 89, so that the long bolt 88 and the slide member 74 are relatively rotatable, but are allowed to shift together in the axial direction of the long bolt 88 alone.

The release pin 66 has slanted portion 66C formed at a base end portion thereof, which corresponds with the slanted portion 74A of the slide member 74.

The base 80 is made from resin and has an insertion hole 80B formed in a flat portion 80A thereof, in which a cylindrical portion 68A of the holder 68 is loosely fitted.

As shown in FIG. 1, the base 80 has a plurality of partition walls 83, 85 integrally provided on the flat portion 80A. The partition wall 85 is formed with a slide-member insertion hole 85A in which the slide member 74 is inserted. The partition wall 83 is formed with a long-bolt insertion hole 83A in which the long bolt 88 is inserted.

The operation of the first embodiment will be described.

To attach the air bag device 10 to the steering wheel 20, the base plate 14 of the air bag main body 12 and the bracket portion 16 of the steering wheel 20 are secured together by fixing bolts 18. Next, the long bolt 88 is threaded in.

In this stage of securing the air bag main body 12 to the steering wheel 20, if an assembler has completely inserted the long bolt 88 beforehand, the inlet portion 81B of the bolt accommodating hole 81 formed in the downward portion 14A of the base plate 14 is an alignment with the male screw portion 88A of the long bolt 88. However, the male screw portion 88A is larger in diameter than the inlet portion 81B. This prevents the male screw portion 88A from passing through the inlet portion 81B, with the result that the bolt hole 18B of the downward portion 14A is out of alignment with the fixing bolt 18; therefore, the air bag main body 12 cannot be attached to the steering wheel 20.

Accordingly, the assembler must loosen the long bolt 88 such that the inlet portion 81B of the bolt accommodating hole 81 comes into alignment with the intermediate portion 88B of the long bolt 88 (see FIG. 5). Upon loosening the long bolt 88, the slide member 74 is moved leftward (in the direction of the arrow B in FIG. 4), and the raised state of the release pin 66 is released; thus, the lock bar 60 changes to the state wherein the movement of the ball 52 is disabled.

In the thus attained state, the air bag 22 will never inflate even if an impact is applied to the air bag main body 12.

Next, the assembler inserts the fixing bolts 18 into the bolt holes 18A and 18B and threads them into the nuts 18C, so that the air bag main body 12 is secured to the steering wheel 20. After that, the long bolt 88 is threaded into; as a result, the slide member 74 is moved rightward (in the direction of the arrow A in FIG. 4), the release pin 66 is pushed up, and the lock bar 60 is moved, whereby the balls 52 become movable. Thereafter, when the car abruptly decelerates, the balls 52 move to cause the air bag 22 to inflate, thereby protecting the passenger.

In the case of removing the air bag main body 12 from the steering wheel 20 the long bolt 88 will remain in the state shown in FIG. 5. Accordingly, if anyone tries to remove the air bag main body 12, the male screw portion 88A of the long bolt 88 will not pass through the inlet portion 81B of the bolt accommodating hole 81 thereby preventing the air bag main body 23 from being removed.

Accordingly, in the case of detaching the air bag main body 12 from the steering wheel 20, the long bolt 88 must be loosened so that the intermediate portion 88B of the long bolt 88 comes into alignment with the inlet portion 81B of the bolt accommodating hole 81 (see FIG. 6). In the state shown in FIG. 6, the slide member 74 is not in contact with the release pin 66, and the release pin 66 is not pushed up; thus, the lock bar 60 is keeps the balls 52 from moving.

Therefore, in the thus attained condition, the air bag 22 cannot be inflated even if an impact is applied to the air bag main body 12.

Figure 9:
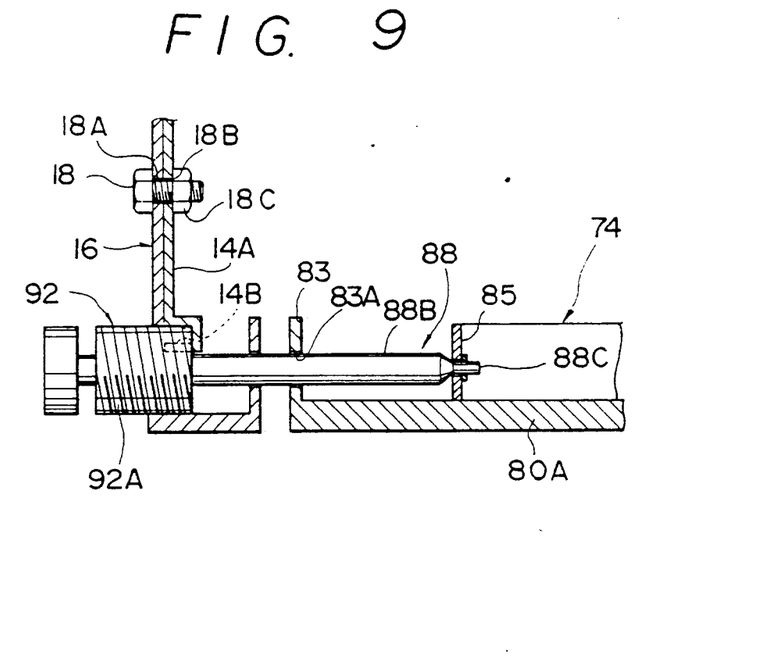
FIG. 9 is a schematic side view showing the long bolt in a threaded-in state, which corresponds to FIG. 5.
Figure 10:
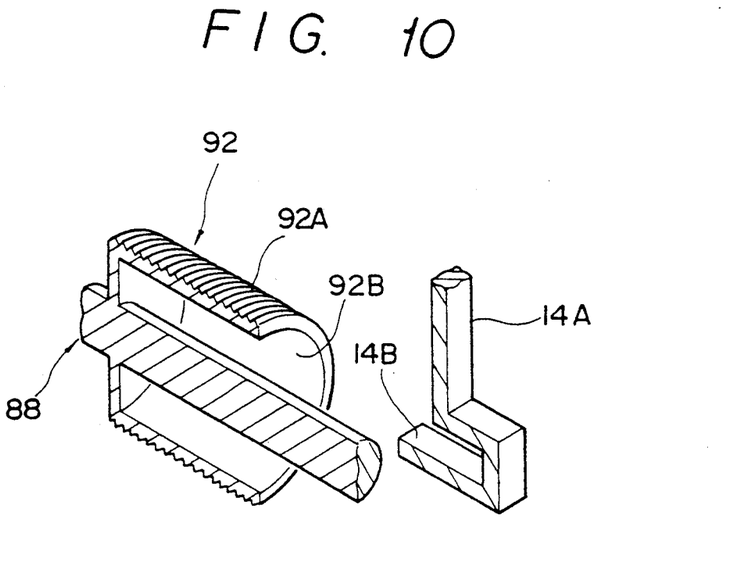
FIG. 10 is a fragmentary perspective view, partly in cross section, showing the long bolt and an engaging portion.

FIGS. 9 and 10 show a second embodiment of the air bag device according to the present invention.

In this embodiment, the long bolt 88 has an engaging portion 92 which is cylindrical with a substantially u-shape in cross section formed in a root portion thereof. The outer peripheral surface of the engaging portion 92 includes a male screw portion 92A. As shown in FIG. 10, the distal end (the right-hand end in FIG. 9) of the engaging portion 92 has an opening 92B.

In this connection, the downward portion 14A of the base plate 14 has an engaging portion 14B of a substantially L-shape in cross section, which is inserted in and engaged with the opening 92B of the engaging portion 92.

Accordingly, in this embodiment, even if someone tries to attach the air bag main body 12 to the steering wheel 20 with the long bolt 88 in an inserted state, it cannot be achieved because the engaging piece 14B of the downward portion 14A comes into contact with the peripheral surface of the engaging portion 92.

For this reason, when the air bag main body 12 is to be attached to the steering wheel 20, the long bolt 88 must be loosened so that the engaging piece 14B disengages from the engaging portion 92.

In this way, the long bolt 88 is loosened at the time of attaching and detaching the air bag main body 12 so that the slide member 74 does not make contact with the release pin 66; therefore, the air bag 22 will never inflate even if an impact is applied to the air bag main body 12 erroneously.

What is claimed is:

1. An air bag device for a vehicle to be put in operation in case of an emergency, comprising:
   (a) an air bag main body in which an air bag is accommodated,
   (b) inflating means accommodated in the air bag main body for inflating the air bag,
   (c) an acceleration sensor accommodated in the air bag main body for detecting a large deceleration to actuate inflating means,
   (d) mounting means for mounting the air bag main body to a body of the vehicle,
   (e) acceleration-sensor deactivating means which takes a first state in which the operation of the acceleration sensor is disabled even if a large acceleration is imposed and a second state in which the operation of the acceleration sensor is activated,
   (f) releasing means for releasing the deactivating means to put the acceleration sensor in an activated state, and
   (g) restricting means for preventing the mounting means from achieving its function of attaching the air bag main body to the body of the vehicle when the acceleration-sensor deactivating means is in the second state and allowing the mounting means to achieve its function when the acceleration-sensor deactivating means is in the first state,
   whereby the air bag is prevented from being inflated accidentally in response to an impact imparted before the air bag main body is attached to the body of the vehicle.

2. An air bag device for a vehicle according to claim 1, wherein the restricting means includes a restricting member for preventing the air bag main body from approaching a designated attaching area when the deactivating means is in the second state.

3. An air bag device for a vehicle according to claim 2, wherein the restricting member includes a detecting portion for detecting the states of the releasing means corresponding to the first and second states of said deactivating means.

4. An air bag device for a vehicle according to claim 3, wherein the deactivating means changes from a first state to a second state as it moves in the axial direction thereof.

5. An air bag device for a vehicle according to claim 4, wherein the releasing means includes a first portion having a first diameter and a second portion having a second diameter disposed in axially-spaced relation correspondingly to the detecting portion wherein said first diameter is larger than said second diameter.

6. An air bag device for a vehicle according to claim 5, wherein the releasing means is threadedly engaged with the air bag main body, wherein the releasing means moves a distance which is proportional to the amount of engagement of the releasing means with the air bag main body.

7. An air bag device for a vehicle according to claim 5, wherein the detecting portion prevents the air bag main body from moving to a designated attaching area when it comes into abutment with the first portion of the releasing means.

8. An air bag device for a vehicle according to claim 5, wherein said releasing means is a bolt, the detecting portion being formed with a bolt accommodating hole having a narrow inlet portion through which the second portion of the bolt passes and a wide bottom portion through which the first portion of the bolt passes, whereby the detecting portion detects the axially-moved position of the bolt.

9. An air bag device for a vehicle according to claim 5, wherein said releasing means is a bolt and the detecting portion which, when the amount of engagement of the releasing means in the form of a bolt with the air bag main body is of a first magnitude, alignment with a periphery of the second portion of the bolt allows the air bag main body to be inserted to a designated attaching area, and when the amount of engagement of the bolt with the air bag main body is of a second magnitude, wherein the second magnitude is larger than the first magnitude, abutment with the periphery of the first portion of the bolt prevents the air bag main body from being inserted to the designated attaching area.

10. An air bag device for a vehicle according to claim 9, wherein the first portion of the bolt is cylindrical, and the changing of the releasing means to the second state is allowed by the detecting portion which is inserted into the first cylindrical portion only after the air bag main body is secured to the body of the vehicle.

11. An air bag device of the type in which an air bag accommodated in an air bag main body is inflated upon actuation of an acceleration sensor, comprising
(a) an attaching means formed with an insertion hole for an attaching screw for attaching the air bag main body to a body of a vehicle,
(b) a deactivation releasing member for putting the acceleration sensor in an acceleration-detection activating state upon rotation, and
(c) a restricting means which, when the deactivating releasing member is in the acceleration-detection activating state, abuts with the deactivating releasing member to bring the insertion hole out of alignment with the attaching screw to thereby prevent the air bag main body from being attached to the body of a vehicle.

12. An air bag device according to claim 11, wherein the deactivating releasing member changes its position in alignment with the releasing means as it is threaded into the air bag main body.

13. An air bag device according to claim 12, wherein the releasing member includes a first portion having a first diameter which comes into alignment with the restricting means when the acceleration sensor is in an acceleration-detection deactivating state, and a second portion having a second diameter which comes into alignment with the restricting means when the acceleration sensor is in the acceleration-detection activating state wherein the first diameter is smaller than the second diameter.

14. An air bag device according to claim 13, wherein the restricting means, only when in an aligned state with the first portion of the releasing means, brings the insertion hole in alignment with the attaching screw after the air bag main body is attached to the body of the vehicle.

15. An air bag device according to claim 14, wherein the restricting means, when in an engaged state with the second portion of the releasing means, prevents the air bag main body from being detached, and when in the aligned state with the first portion of the releasing means after the releasing means is loosened, allows the air bag main body to be detached.

16. An air bag device according to claim 13, wherein the second portion of the releasing means is cylindrical, and the restricting means, when the air bag main body is attached to the body of the vehicle, is partially inserted into the interior of the second portion of the releasing means to prevent the air bag main body from being detached from the body of the vehicle.

17. A air bag device according to claim 13, wherein the restricting means has a restricting means accommodating hole consisting of a narrow inlet portion corresponding to the first portion of the releasing means and a wide bottom portion corresponding to the second portion of the releasing means.

18. An air bag device to be attached to the steering wheel of a vehicle, comprising
(a) a base member,
(b) an air bag for attaching to the base member,
(c) an inflator for inflating the air bag,
(d) an acceleration sensor for actuating the inflator,
(e) lock means for putting the acceleration sensor in a locked state at a first position and in an operation activation state at a second position,
(f) a screw for securing the base member to the steering wheel when the base member is at a designated attaching position relative to the steering wheel,
(g) a releasing bolt having a first portion of a first diameter provided in a first releasing bolt position in close proximity to the lock means and a second portion having a second diameter provided in a second releasing bolt position which is farther from the lock means than the first releasing bolt position, to activate the acceleration sensor when rotated wherein the first diameter is smaller than said second diameter, and
(h) restricting means projecting from the base member which, when the deactivating releasing bolt is provided in the second releasing bolt position, alignment with the first portion of the releasing bolt allows the base member to be inserted up to a designated attaching position, and when it is provided in the first releasing bolt position, alignment with the second portion of the releasing bolt prevents the base member from being inserted up to the designated attaching position.

19. An air bag device according to claim 18, wherein the retricting means is a plate member formed with a narrow inlet portion through which the first portion of the releasing bolt passes and a wide bottom hole through which the second portion of the releasing bolt passes, and the insertion of the base member in its attaching direction is restricted when the inlet portion in aligned with the second portion of the releasing bolt.

20. An air bag according to claim 18, wherein the restricting means has an arm portion which, when it comes into alignment with the first portion of the releasing bolt, allows the base member to be inserted up to the designated attaching position, and when it comes into abutment with the second portion of the releasing bolt, prevents the base member from being inserted up to the designated attaching position.

* * * * *